(12) United States Patent
Kajigaya

(10) Patent No.: US 8,006,026 B2
(45) Date of Patent: Aug. 23, 2011

(54) MULTI-PORT MEMORY AND COMPUTER SYSTEM PROVIDED WITH THE SAME

(75) Inventor: Kazuhiko Kajigaya, Tokyo (JP)

(73) Assignee: Elpida Memory, Inc., Chuo-ku, Tokyo (JP)

( * ) Notice: Subject to any disclaimer, the term of this patent is extended or adjusted under 35 U.S.C. 154(b) by 0 days.

(21) Appl. No.: 12/382,524

(22) Filed: Mar. 18, 2009

(65) Prior Publication Data

US 2009/0240866 A1    Sep. 24, 2009

(30) Foreign Application Priority Data

Mar. 19, 2008  (JP) ................ P2008-071461

(51) Int. Cl.
*G06F 13/00*    (2006.01)
(52) U.S. Cl. ............ 710/317; 711/149; 365/189.04; 365/189.17
(58) Field of Classification Search ........... 710/316, 710/317; 711/149; 365/189.04, 189.17
See application file for complete search history.

(56) References Cited

U.S. PATENT DOCUMENTS

| | | | |
|---|---|---|---|
| 5,657,289 A | 8/1997 | Hush et al. | |
| 5,717,647 A | 2/1998 | Hush et al. | |
| 5,799,209 A | 8/1998 | Chatter | |
| 6,108,725 A | 8/2000 | Chatter | |
| 6,212,597 B1 | 4/2001 | Conlin et al. | |
| 6,850,954 B2 | 2/2005 | Kawamae et al. | |
| 7,505,353 B2 | 3/2009 | Kim et al. | |
| 2001/0007122 A1* | 7/2001 | Cohen et al. .......... | 711/153 |
| 2002/0078311 A1 | 6/2002 | Matsuzaki et al. | |
| 2003/0135699 A1 | 7/2003 | Matsuzaki et al. | |
| 2005/0268023 A1 | 12/2005 | Briggs et al. | |
| 2007/0147162 A1 | 6/2007 | Kim et al. | |
| 2008/0077747 A1* | 3/2008 | Hur et al. .............. | 711/149 |
| 2009/0254698 A1* | 10/2009 | Kwon et al. .......... | 711/105 |

FOREIGN PATENT DOCUMENTS

| | | |
|---|---|---|
| JP | 5-342856 A | 12/1993 |
| JP | 8-221319 A | 8/1996 |
| JP | 10-511208 A | 10/1998 |
| JP | 2000-501524 A | 2/2000 |
| JP | 2000-243079 A | 9/2000 |
| JP | 2001-511559 A | 8/2001 |
| JP | 2002-197858 A | 7/2002 |
| JP | 2000-215659 A | 8/2002 |
| JP | 2003-263363 A | 9/2003 |
| JP | 2003-272378 A | 9/2003 |
| JP | 2005-346715 A | 12/2005 |
| JP | 2007-172811 A | 7/2007 |

* cited by examiner

*Primary Examiner* — Glenn A Auve
(74) *Attorney, Agent, or Firm* — McGinn IP Law Group PLLC

(57) ABSTRACT

A multi-port memory, comprising: m (m≧2) input/output ports independent of one another; n (n≧2) memory banks independent of one another; and a route switching circuit capable of optionally setting signal routes of a command, an address, and input/output data between the m input/output ports and the n memory banks, wherein the route switching circuit allocates p (1≦p≦m) input/output ports optionally selected from the m input/output ports to a memory bank optionally selected from the n memory banks.

10 Claims, 8 Drawing Sheets

MULTI-PORT MEMORY AND COMPUTER SYSTEM PROVIDED WITH THE SAME

BACKGROUND OF THE INVENTION

1. Field of the Invention

The present invention relates to a multi-port memory with a plurality of input/output ports.

Priority is claimed on Japanese Patent Application No. 2008-71461, filed Mar. 19, 2008, the content of which is incorporated herein by reference.

2. Description of Related Art

Conventionally, DRAMs with a multi-port and multi-bank configuration, and control systems therefor are known.

For example, a conventional semiconductor storage apparatus is disclosed in Japanese Unexamined Patent Application, First Publication No. H08-221319 (Patent Document 1). This semiconductor storage apparatus has: a plurality of memory banks capable of storing data; and a plurality of input/output ports allowing input/output of data. Patent Document 1 discloses a multi-port RAM that couples the plurality of input/output ports to the memory banks via different buses.

Furthermore, a conventional semiconductor memory apparatus and a conventional information processing apparatus are disclosed in Japanese Unexamined Patent Application, First Publication No. 2000-215659 (Patent Document 2). The semiconductor memory apparatus and the information processing apparatus include: m banks including a memory cell region where memory cells are arranged, a row selection circuit for selecting a row in the memory cell region, and a column selection circuit for selecting a column in the memory cell; and n ports. Patent Document 2 discloses an SDRAM provided with a multi-port circuit capable of accessing optional n banks from the n ports independently and simultaneously, where m≧n.

Furthermore, a conventional semiconductor storage apparatus is disclosed in Japanese Unexamined Patent Application, First Publication No. 2002-197858 (Patent Document 3). This semiconductor storage apparatus includes: external N ports each of which receives a command; N sets of buses, each corresponding to each of the external ports; a plurality of memory blocks connected to the N sets of buses; an address comparison circuit for comparing addresses accessed by a plurality of commands that are each input from the external N ports; and a determination circuit for determining, when the address comparison circuit detects accesses to the same memory block through the address comparison, which command is to be executed and which command is not to be executed among the commands that access the same memory block. Patent Document 3 discloses a multi-port DRAM including this semiconductor storage apparatus.

Furthermore, a conventional memory control circuit is disclosed in Japanese Unexamined Patent Application, First Publication No. 2003-263363 (Patent Document 4). This memory control circuit includes: a plurality of ports that are connected to a plurality of independently accessible memory units; selectors that allocate ports to be accessed based on an apportion bit, the apportion bit being a predetermined bit in a memory access request address from each of a plurality of masters; arbitration devices that arbitrate memory access requests from the plurality of masters, the memory access requests being allocated by the selectors each connected to each port; and access devices that control a signal for accessing a memory according to contents of the memory access request of the master determined by the arbitration device connected to each of the ports. Patent document 4 discloses an SDRAM with this memory control circuit.

Furthermore, a conventional semiconductor storage apparatus is disclosed in Japanese Unexamined Patent Application, First Publication No. 2003-272378 (Patent Document 5). This semiconductor storage apparatus includes: a cell array made of volatile memory cells and including a plurality of banks; a plurality of external ports each capable of accessing independent addresses of the cell array; an arbitration circuit that determines order of access among the plurality of external ports; and a control circuit that outputs a busy signal to one of the plurality of the external ports if one bank is executing a core operation at the time of access request from the one port. Patent Document 5 discloses a DRAM type multi-port memory including this semiconductor storage apparatus.

Furthermore, a conventional multi-port random access memory is disclosed in Japanese Unexamined Patent Application, First Publication No. 2005-346715 (Patent Document 6). This multi-port random access memory includes a plurality of memory banks, a plurality of buses, and a selection mechanism. This selection mechanism is connected to every memory bank in the plurality of memory banks and to every bus in the plurality of buses. The selection mechanism selects any memory bank from the plurality of memory banks to connect to any bus from the plurality of buses. Patent Document 6 discloses a multi-port RAM system with this multi-port random access memory.

Furthermore, a conventional multi-port semiconductor memory apparatus with a variable access route and a method thereof are disclosed in Japanese Unexamined Patent Application, First Publication No. 2007-172811 (Patent Document 7). This multi-port semiconductor memory includes: a plurality of input/output ports different from one another; a memory array divided into a plurality of memory regions different from one another; and a selection control circuit for variably controlling access routes between the memory regions and the input/output ports so that each of the memory regions is accessed via at least one of the input/output ports.

Furthermore, a conventional multi-port internally cached DRAM is disclosed in Published Japanese translation No. 2001-511559 of the International Publication (Patent Document 8). This multi-port internally cached DRAM includes a multi-port internally cached DRAM array. A plurality of system I/O resources are connected via common internal data buses connected to corresponding DRAM cores in each unit of the array. One system I/O resource as a source of transmission writes a message in the internal DRAM cache array. Next, this message is read and simultaneously transferred to all the system I/O resources that are required to receive this message.

Patent Documents 1 to 8 disclose DRAMs with a multi-port and multi-bank configuration, and control methods and systems thereof In Patent Documents 1 to 8, a problem as follows occurs when with a plurality of banks allocated to a plurality of CPU cores via a plurality of input/output ports, data transfer load of an input/output port exceeds the limit of the data transfer capability during the period of time when a data transfer of another input/output port is not performed. That is, a problem occurs in that it is not possible to integrate a data signal line of an input/output port where no transfer is performed into a data signal line of an input/output port where the data transfer capability has exceeded the limit, to thereby dynamically improve the data transfer capability.

On the other hand, a conventional multi-port internally cached dynamic random access memory system is disclosed in Published Japanese translation No. 2000-501524 of the International Publication (Patent Document 9). This multi-port internally cached dynamic random access memory system is for use in a system having a master controller having parallel ports and a DRAM each connected for access to a common bus interface. The multi-port internally cached dynamic random access memory system includes a multi-port internally cached DRAM. This internally cached DRAM includes a plurality of independent serial data interfaces each connected between a separate external I/O resource and internal DRAM memory through corresponding buffers. A switching module is interposed between the serial interfaces and the buffers. In addition, the internal cache DRAM is controlled by the master bus controller so that a switching module logic dynamically makes a route between the serial interfaces and the buffers. Thus, there is disclosed a multi-port DRAM system that configures an input/output port by integrating one or more of the serial interfaces according to the external I/O resources, the system being capable of varying the number of serial interfaces according to the types of the external I/O resources.

However, with the technique disclosed in Patent Document 9, the number of the serial interfaces that are integrated according to the types of the external I/O resources is fixed for every system. As a result, a problem occurs when with a plurality of banks allocated to a plurality of CPU cores via a plurality of input/output ports, data transfer load of an input/output port exceeds the limit of the data transfer capability during the period of time when a data transfer of another input/output port is not performed. That is, a problem occurs in that it is not possible to integrate a data signal line of an input/output port where no transfer is performed into a data signal line of an input/output port where the data transfer capability has exceeded the limit, to thereby implement a function of dynamically improving the data transfer capability.

Furthermore, a conventional random access semiconductor memory apparatus is disclosed in Japanese Unexamined Patent Application, First Publication No. H05-342856 (Patent Document 10). In this random access semiconductor memory apparatus, there is provided an independent read/write control circuit for every data input/output terminal. Patent Document 10 discloses a random access memory that allows a partial read of data by use of some of a plurality of data input/output terminals or a simultaneous execution of a read of data by use of some of a plurality of data input/output terminals and a write of data by use of the others of the data input/output terminals. However, Patent Document 10 does not disclose a technique of accessing a plurality of CPU cores via a plurality of input/output ports.

Furthermore, a conventional SAM having an extendable data width for a multi-port RAM is disclosed in Published Japanese translation No. H10-511208 of the International Publication (Patent Document 11). The SAM includes a multi-port memory with SAM portions where a data width is adjustable. However, the technique disclosed in Patent Document 11 is for adjusting data widths of the SAM portions and the RAM portion. This poses a problem in that it is not possible to adjust a data transfer capability between a plurality of input/output ports.

Furthermore, a conventional semiconductor integrated circuit apparatus is disclosed in Japanese Unexamined Patent Application, First Publication No. 2000-243079 (Patent Document 12). Patent Document 12 discloses a technique of DRAM with a cache where a plurality of DRAM banks and an SRAM array are integrated. However, in the technique disclosed in Patent Document 12, the SRAM portion has two sets of input/output lines but has only one set of ports for performing a data transfer with the outside of the chip. This poses a problem in that it is not possible to adjust a data transfer capability between a plurality of banks and a plurality of input/output ports.

As described above, in a DRAM with a multi-port and multi-bank configuration of a conventional technique, when with a plurality of banks allocated to a plurality of CPU cores via a plurality of input/output ports, data transfer load of an input/output port exceeds the limit of its data transfer capability, it was not possible to integrate a data signal line of an input/output port where no transfer is performed into a data signal line of an input/output port where the data transfer capability has exceeded the limit, to thereby dynamically improve the data transfer capability.

SUMMARY

In one embodiment, there is provided a multi-port memory including: m ($m \geq 2$) input/output ports independent of one another; n ($n \geq 2$) memory banks independent of one another; and a route switching circuit capable of optionally setting signal routes of a command, an address, and input/output data between the m input/output ports and the n memory banks, in which the route switching circuit is configured to allocate p ($1 \leq p \leq m$) input/output ports optionally selected from the m input/output ports to a memory bank optionally selected from the n memory banks.

In the multi-port memory with the above configuration, there is provided a route switching circuit capable of optionally setting input/output routes of a command, an address, and input/output data between a plurality of input/output ports and a plurality of memory banks, and optionally selected one or more input/output ports are allocated to a selected memory bank.

Therefore, in the multi-port memory with the plurality of memory banks and the plurality of input/output ports, it is possible to allocate one or more input/output ports to a selected memory bank. When input/output data transfer load of a port exceeds the limit of its data transfer capability during the period of time when an input/output data transfer of another input/output port is not performed, it is possible to integrate an input/output data pin of the port where no transfer is performed into a DQ pin of the port where the data transfer capability has exceeded the limit, to thereby increase an input/output bit width. In this manner, it is possible to integrate a data signal line of an input/output port where no transfer is performed into a data signal line of an input/output port where the data transfer capability has exceeded the limit, to thereby dynamically improve the data transfer capability.

In one embodiment, there is provided a computer system of the present invention includes a processor made of a CPU core: and a multi-port memory with a plurality of input/output ports, in which the multi-port memory includes: m ($m \geq 2$) input/output ports independent of one another; n ($n \geq 2$) memory banks independent of one another; and a route switching circuit capable of optionally setting signal routes of a command, an address, and input/output data between the m input/output ports and the n memory banks, in which the route switching circuit is configured to allocate p ($1 \leq p \leq m$) input/output ports optionally selected from the m input/output ports to a memory bank optionally selected from the n memory banks, and in which an allocation process of the input/output ports to the memory bank in the route switching circuit is configured to be controlled by the processor.

In the computer system of the present invention with the above configuration, the aforementioned multi-port memory and a processor made of a CPU core are provided, and an allocation process of the input/output ports to a memory bank in the multi-port memory is configured to be controllable by the processor.

As a result, according to a required amount of access band width of a CPU and to memory access ready periods of the other CPUs, it is possible to dynamically change a bit width of the data input/output signal for an optional single CPU core and an optional single bank, for example, to an 8-bit width, a 16-bit width, or a 32-bit width.

In another embodiment, there is provided a computer system of the present invention includes: a processor; first and second memory banks; a first data input/output portion provided between the processor and the first memory bank, and coupled to the first memory bank, receiving first data from or sending the first data to the first memory bank, each of the receiving and sending of the first data input/output portion being controlled by the processor; a second data input/output portion provided between the processor and the second memory bank, and coupled to the second memory bank, receiving second data from or sending the second data to the second memory bank, each of the receiving and sending of the second data input/output portion being controlled by the processor and; a route switching circuit provided between the first memory bank and the second data input/output portion, connecting the first memory bank and the second data input/output portion so that the first and second data input/output portions respectively receiving the first and second data from or sending the first and second data to the first memory bank when the route switching circuit receiving a first command signal from the processor.

BRIEF DESCRIPTION OF THE DRAWINGS

The above features and advantage of the present invention will be more apparent from the following description of certain preferred embodiments taken in conjunction with the accompanying drawings, in which.

DETAILED DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Embodiments of the present invention relate to a multi-port memory with a multi-port and multi-bank configuration, such as random access memory (RAM), that is effectively adopted in a system including a multi-core processor where a single processor is equipped with a plurality of CPU cores.

In a multi-port memory unit according to the embodiments of the present invention, a plurality of banks are allocated to a plurality of CPU cores via one or more input/output ports. When a data transfer load of an input/output data of a port exceeds the limit of the data transfer capability during the period of time when an input/output data transfer of another port is not performed, an input/output data pin of the pin where no transfer is performed into a DQ pin (input/output pin) of the port where the data transfer capability has exceeded the limit, to thereby increase a data input/output bit width. As a result, a function of dynamically improving the data transfer capability is implemented.

To be more specific, the multi-port memory includes: a route switching circuit that includes crossbar switches that optionally sets signal routes between a plurality of input/output ports and a plurality of memory banks; a data bit width switching circuit that changes an input/output data bit width configuration of an access target memory bank according to a command from the outside; and a route control circuit that dynamically changes connection routes of the crossbar switches.

Hereunder is a description of embodiments of the present invention with reference to the appended drawings. In the following description, a "memory bank" is also referred to simply as a "bank."

First Embodiment

Figure 1:
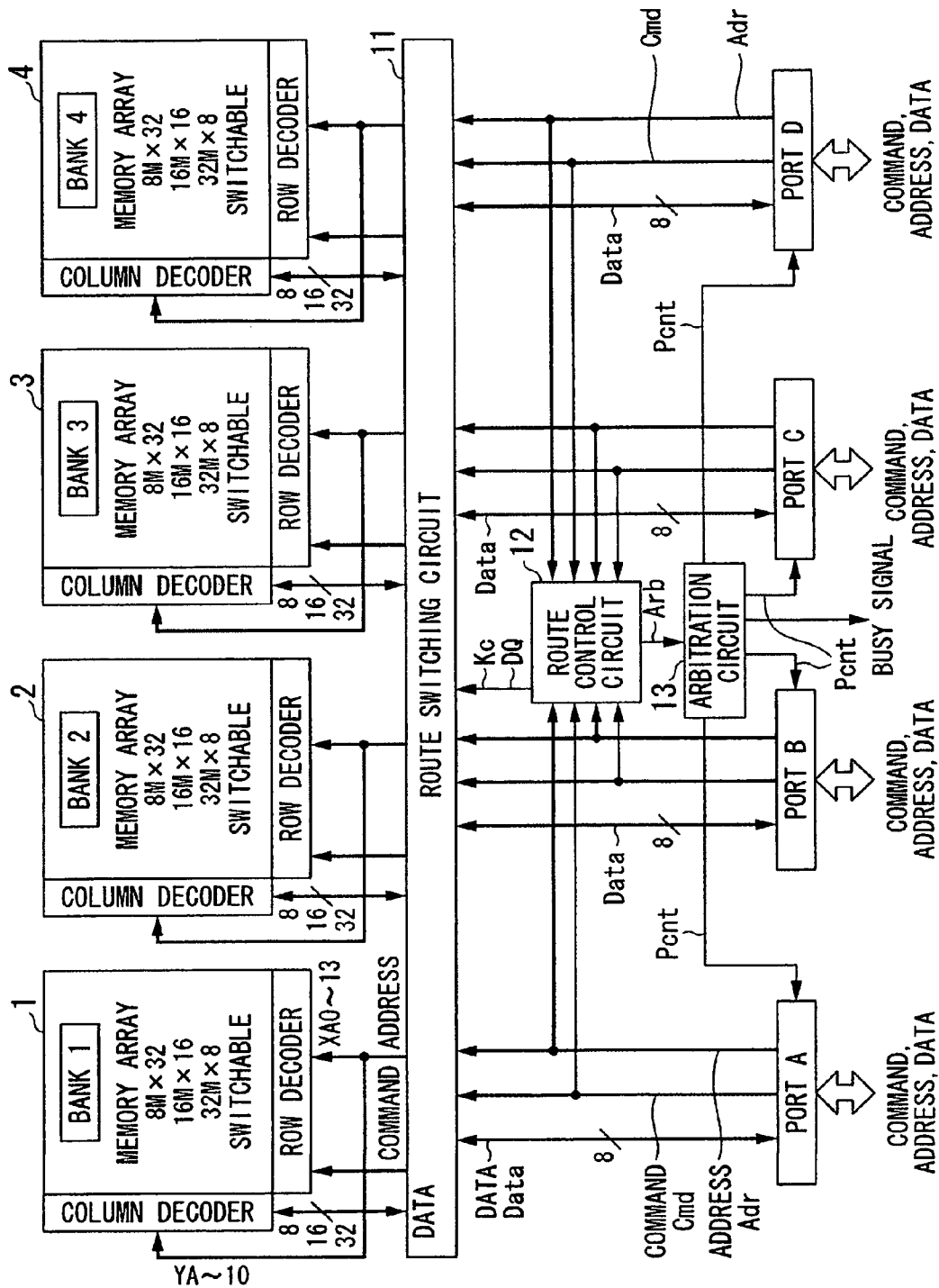
FIG. 1 shows a configuration of a multi-port memory according to a first embodiment of the present invention.

FIG. 1 is a block diagram showing a general configuration of a multi-port memory according to a first embodiment of the present invention. The multi-port memory shown in FIG. 1 has a 4-bank configuration made of four memory arrays. In each of the banks 1, 2, 3, and 4, a row decoder and a column decoder are arranged for selecting a memory cell. Furthermore, for every memory bank, a clock and timing control circuits, a data read/write circuit, and the like (not shown in the figure) are independently arranged as well. Thereby, the banks 1, 2, 3, and 4 are capable of operating independently of one another.

Each of the banks 1, 2, 3, and 4 includes a 256-Mbit memory cell. As will be described later, a bit width of a data input/output signal is controlled so as to be switchable among 8 bits, 16 bits, and 32 bits. In correspondence to this, each of the banks 1, 2, 3, and 4 has a configuration of: 32-M word×8 bits; 16-M word×16 bits; and 8-M word×32 bits.

In each of the banks 1, 2, 3, and 4, row addresses XA0 to XA13 are supplied to the row decoder, and column addresses YA0 to YA10 are supplied to the column decoder. Furthermore, one of the four banks 1, 2, 3, and 4 is selected by a bank address (not shown in the figure). As will be described later, when a bit width of a data input/output signal is changed, one or two high bits of a column address are treated as don't care bit(s).

The multi-port memory according to embodiments of the present invention further includes four ports: a port A, a port B, a port C, and a port D as input/output ports. A command signal and an address signal are input from the outside through the ports A, B, C, and D. Thus, data is input from or output to the outside.

Here, an input/output bit width of data from/to the outside is 8 bits for every port. To the input/output ports A, B, C, and D, there are connected four sets of signal buses of an internal command signal Cmd, an address signal Adr, and a data signal Data via a route switching circuit 11 in a manner switchable to optional banks 1, 2, 3, and 4.

On the other hand, to the route switching circuit 11, the command signal Cmd, the address signal Adr, and the data signal Data corresponding to each of the ports A, B, C, and D are input. Based on the command signal Cmd, routes between the input/output ports A, B, C, and D and the banks 1, 2, 3, and 4 are dynamically set by a route switching signal Kc that is output from a route control circuit 12.

When a DQ integration mode, which will be described later, is selected by the command signal Cmd, a DQ integration signal DQ is output from the route control circuit 12 to the route switching circuit 11. As a result, the route control circuit 12 switches the connection state of the route switching circuit 11 so as to implement the requested DQ integration mode.

When simultaneous accesses occur from two or more input/output ports to the same bank, the route control circuit 12 outputs an arbitration signal Arb to an arbitration circuit 13. The arbitration circuit 13 outputs a port control signal Pcnt to the input/output ports A, B, C, and D on a presubscribed arbitration policy. As a result, the arbitration circuit 13 arbitrates operations of the input/output ports A, B, C, and D and also outputs a busy signal to the external source of the access request.

Figure 2:
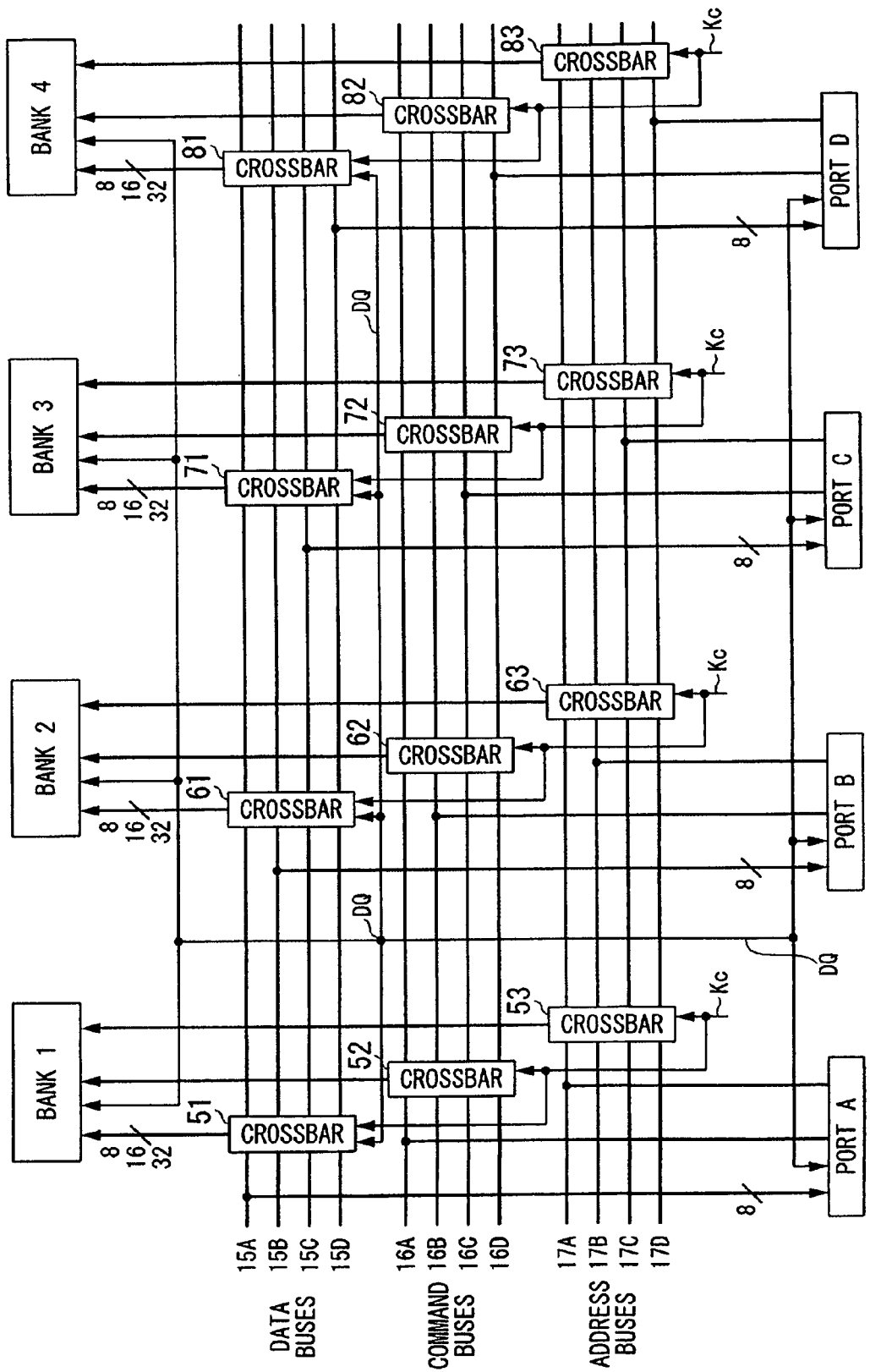
FIG. 2 shows an exemplary configuration of a route switching circuit.

FIG. 2 shows a specific configuration of the route switching circuit 11 of FIG. 1. Signal routes between the four banks 1, 2, 3, and 4 and the four ports A, B, C, and D are optionally and reconfigurably set by crossbar switches 51 to 53, 61 to 63, 71 to 73, and 81 to 83 that are controlled by the route switching signal Kc. Furthermore, the DQ integration signal DQ is input to the banks 1, 2, 3, and 4, to the four crossbar switches 51, 61, 71, and 81 connected with data buses 15A to 151D, and to the input/output ports A, B, C, and D, to thereby implement the DQ integration mode, which will be described later.

Figure 3:
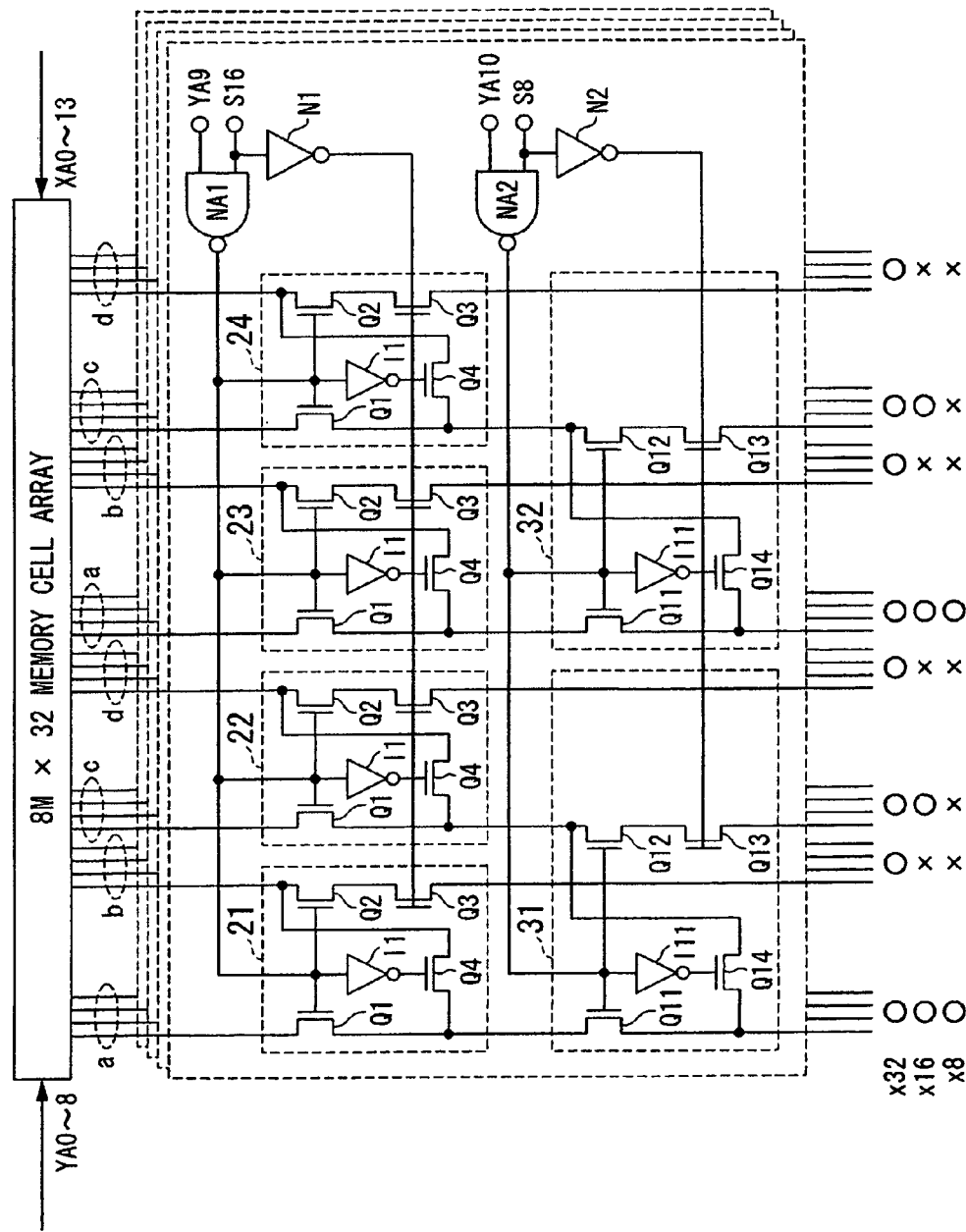
FIG. 3A shows an exemplary configuration of a bank data bit width switching circuit.
FIG. 3B is a truth table for DQ integration signals.

FIG. 3A shows a circuit provided in each of the banks 1, 2, 3, and 4 of FIG. 2. It shows a detailed configuration of a circuit that changes a data input/output bit width of the banks 1, 2, 3, and 4.

The data input/output bit width switching circuit shown in FIG. 3A is made of four layers of circuits. Each of the layer is provided with: data signal line switching circuits 21, 22, 23, and 24 corresponding to a column address YA9 system; and data signal line switching circuits 31, 32 corresponding to a column address YA10 system. To each of the data signal line switching circuits 21, 22, 23, and 24, there are connected corresponding 2-bit data signal lines from a memory cell array. To the data signal line switching circuits 31, 32, there are connected corresponding 2-bit data signal lines via the data signal line switching circuits 21 to 24.

To a NAND gate NA1, the column address YA9 and a DQ integration signal S16 are input. The DQ integration signal S16 functions as an input signal of an inverter N1. To a NAND gate NA2, the column address YA10 and a DQ integration signal S8 are input. The DQ integration signal S8 functions as an input signal of an inverter N2.

FIG. 3B is a truth table for the DQ integration signals S16, S8. "x32" in the table denotes a selection of a 32-bit wide data signal line for the memory cell array. "x16" in the table denotes a selection of a 16-bit wide data signal line. "x8" in the table denotes a selection of an 8-bit wide data signal line. For example, in a normal mode where no DQ integration is performed, both of the DQ integration signals S8 and S16 are controlled to a high level 'HIGH (H).'

Each of the data signal line switching circuits 21 to 24 is made of: four NMOS transistors Q1, Q2, Q3, and Q4; and an inverter I1. Drains of the transistors Q1, Q2 are connected to a corresponding data signal line. Gates of the transistors Q1 and Q2 are connected to an output of the NAND gate NA1 and are also connected to an input of the inverter I1.

A source of the transistor Q1 functions as an output signal for the data signal line switching circuit 31, and is also connected to a source of the transistor Q4. A gate of the transistor Q4 is connected to an output of the inverter I1. A drain of the transistor Q4 is connected to a drain of the transistor Q2. The transistor Q3 has a drain connected to a source of the transistor Q2, and has a gate connected to an output of the inverter N1. Furthermore, the transistor Q3 has a source connected to an external input/output data signal line (an input/output data signal line on the bottom in the figure).

On the other hand, each of the data signal line switching circuits 31, 32 similarly includes: four NMOS transistors Q11, Q12, Q13, and Q14; and an inverter I11. Drains of the transistors Q11, and Q12 are connected to corresponding sources of the transistors Q1 in the switching circuits 21 to 24. Gates of the transistors Q1 and Q12 are connected to an output of the NAND gate NA2 and are also connected to an input of the inverter I11.

A source of the transistor Q11 is connected to an external input/output data signal line and is also connected to a source of the transistor Q14. A gate of the transistor Q14 is connected to an output of the inverter I11. A drain of the transistor Q14 is connected to a drain of the transistor Q12. The transistor Q13 has a drain connected to a source of the transistor Q12, a gate connected to an output of the inverter N2, and a source connected to an external input/output data signal line.

As described above, signals S16 and S8 in FIG. 3B are DQ integration signals. In the normal operation mode where no DQ integration is performed, both of the signals S8 and S16 are controlled to a high level.

For example, if the column addresses YA9 and YA10 are LOW, outputs of the NAND gates NA1, and NA2 are HIGH. In the switching circuit 21, the switching circuit 22, and the switching circuit 31, Q1 and Q11 are ON, and Q3, Q4, Q13, and Q14 are OFF. In the switching circuit 23, the switching circuit 24, and the switching circuit 32, Q1 and Q11 are ON, and Q3, Q4, Q13, Q14 are OFF. As a result, 8-bit data signal lines designated by reference character a in FIG. 3A are selected. If YA9 is HIGH and YA10 is LOW, 8-bit data signal lines designated by reference character b in FIG. 3A are selected. If YA9 is LOW and YA10 is HIGH, 8-bit data signal lines designated by reference character c in FIG. 3A are selected. If YA9 is HIGH and YA10 is HIGH, 8-bit data signal lines designated by reference character d in FIG. 3A are selected.

In this manner, of 32-bit wide data input/output signal lines corresponding to the memory cell array with a configuration of an 8-M word×32 bits, 8-bit ones with a quarter of the full length are selected by the column addresses YA9 and YA10. The selected data input/output signal lines are shown with a circle on the right of reference numeral x8 that is written on the bottom of FIG. 3A.

On the other hand, in a DQ integration mode where DQs of two input/output ports are integrated, the signal S16 is controlled to HIGH and the signal S8 is controlled to LOW. As a result, the column address YA10 is treated as don't care. Of 32-bit wide data input/output signal lines corresponding to the memory cell array with a configuration of an 8-M word× 32 bits, 16-bit ones with a half of the full length are selected by YA9. The selected data input/output signal lines are shown with a circle on the right of reference numeral x16 that is written in FIG. 3A.

Furthermore, in a DQ integration mode where DQs of the four input/output ports are integrated, both of the signals S16, S8 are controlled to LOW. As a result, both of the column addresses YA9 and YA10 are treated as don't care. All the 32-bit wide data input/output signal lines corresponding to the memory cell array with a configuration of an 8-M word× 32 bits are selected. The selected data input/output signal lines are shown with a circle to the right of reference numeral x16 that is written in FIG. 3A.

Figure 4:
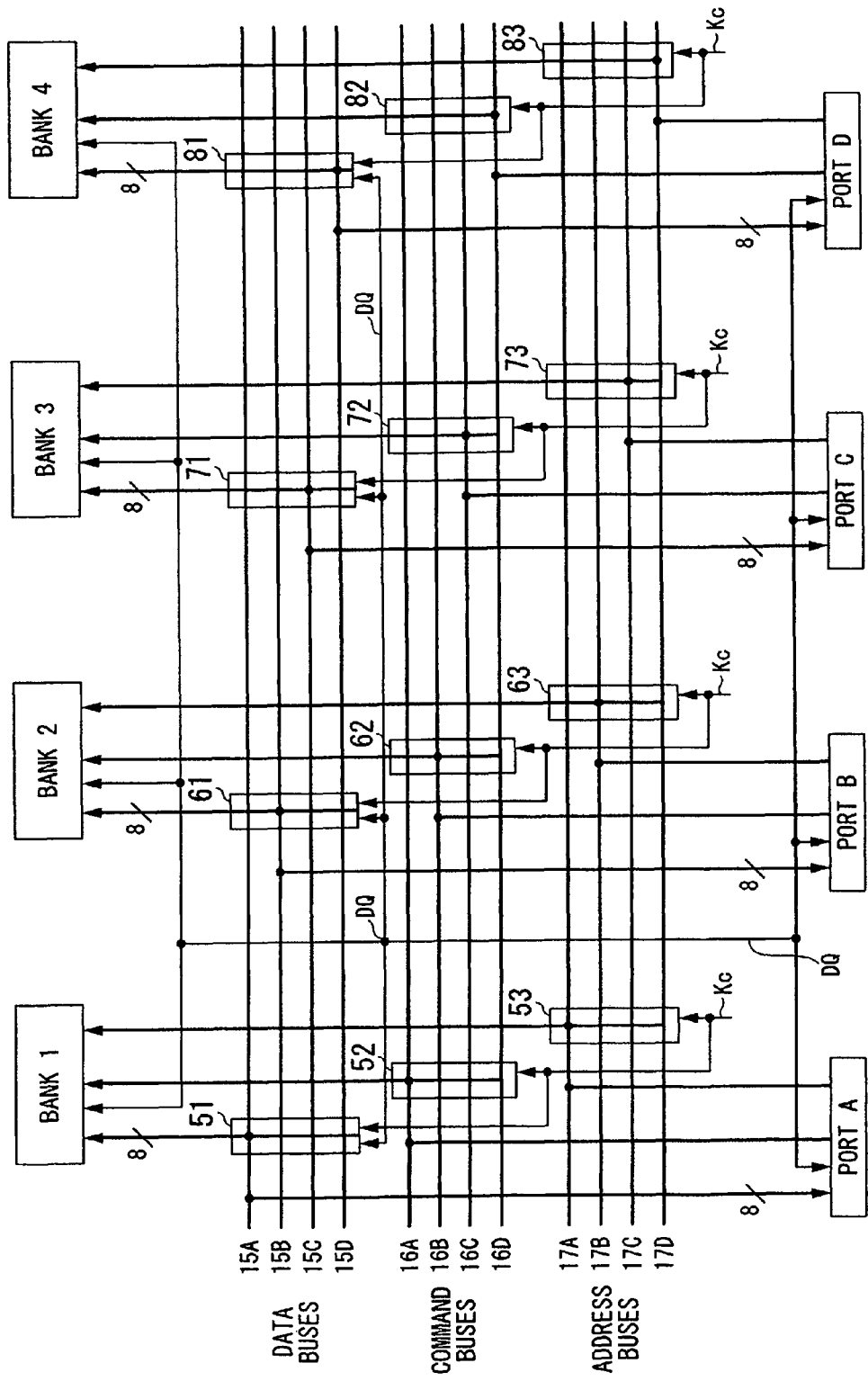
FIG. 4 shows signal routes in a-normal state.

FIG. 4 shows a connection state of address buses 17A to 17D, command buses 16A to 16D, and data buses 15A to 15D between the four banks 1, 2, 3, and 4 and the four input/output ports A, B, C, and D in the normal operation mode in the route switching circuit 11 of FIG. 2. Here, a contact point shown with a filled circle in boxes that denote crossbar switches 51 to 53, 61 to 63, 71 to 73, and 81 to 83 is in a connected state. In this example, through control by the route switching signal Kc, the port A is connected to the bank 1 via the crossbar switches 51 to 53. The port B is connected to the bank 2 via the crossbar switches 61 to 63. The port C is connected to the bank 3 via the crossbar switches 71 to 73. The port D is connected to the bank 4 via the crossbar switches 81 to 83.

Furthermore, as described for FIG. 3A and FIG. 3B, the data input/output signal buses of the banks 1, 2, 3, and 4 are essentially 8 bit wide. Correspondingly, the data input/output bit widths of the ports A, B, C, and D are 8 bit wide.

Figure 5:
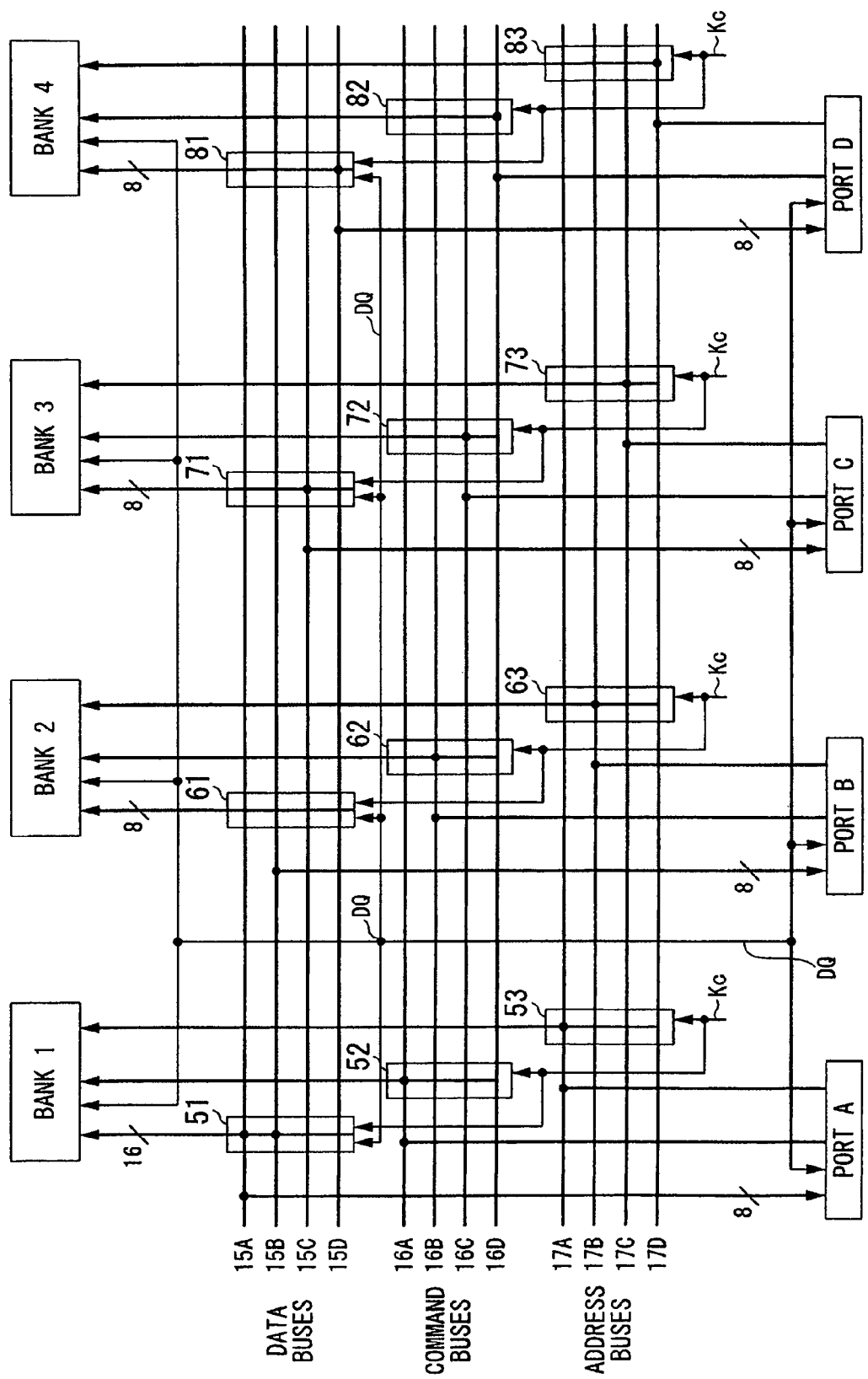
FIG. 5 shows signal routes when a port A uses DQ pins of the port A and a port B.

FIG. 5 is for explaining an example of DQ integration mode in the route switching circuit 11 of FIG. 2. FIG. 5 shows a connection state of the address buses 17A to 17D, the command buses 16A to 16D, and the data buses 15A to 15D between the four banks 1, 2, 3, and 4 and the four input/output ports A, B, C, and D in the case where a system made of the port A and the bank 1 uses the DQ pins of the port A and the port B.

In this case, as described for FIG. 3A, the data input/output signal bus of the bank 1 is essentially 16 bit wide. This 16-bit wide input/output data signal line is divided into 8-bit widths, each connected to the data bus 15A and the data bus 15B by the crossbar switch 51 on the upper left portion that has received a DQ integration signal. As a result, the 16-bit wide data input/output signal of the bank 1 is divided and connected to the 8-bit wide DQ pin of the port A and the 8-bit wide DQ pin of the port B.

Here, the DQ integration signal DQ that is input to the ports controls the ports whose DQ pins are integrated (port B, in this example) so that the data input/output timing of the port B is synchronized with the data input/output timing of the ports into which the DQ pins are integrated (port A, in this example). In the connection state of FIG. 5, a system made of the bank 3 and the port C, and a system made of the bank 4 and the port D are each capable of having access independently of this.

Figure 6:
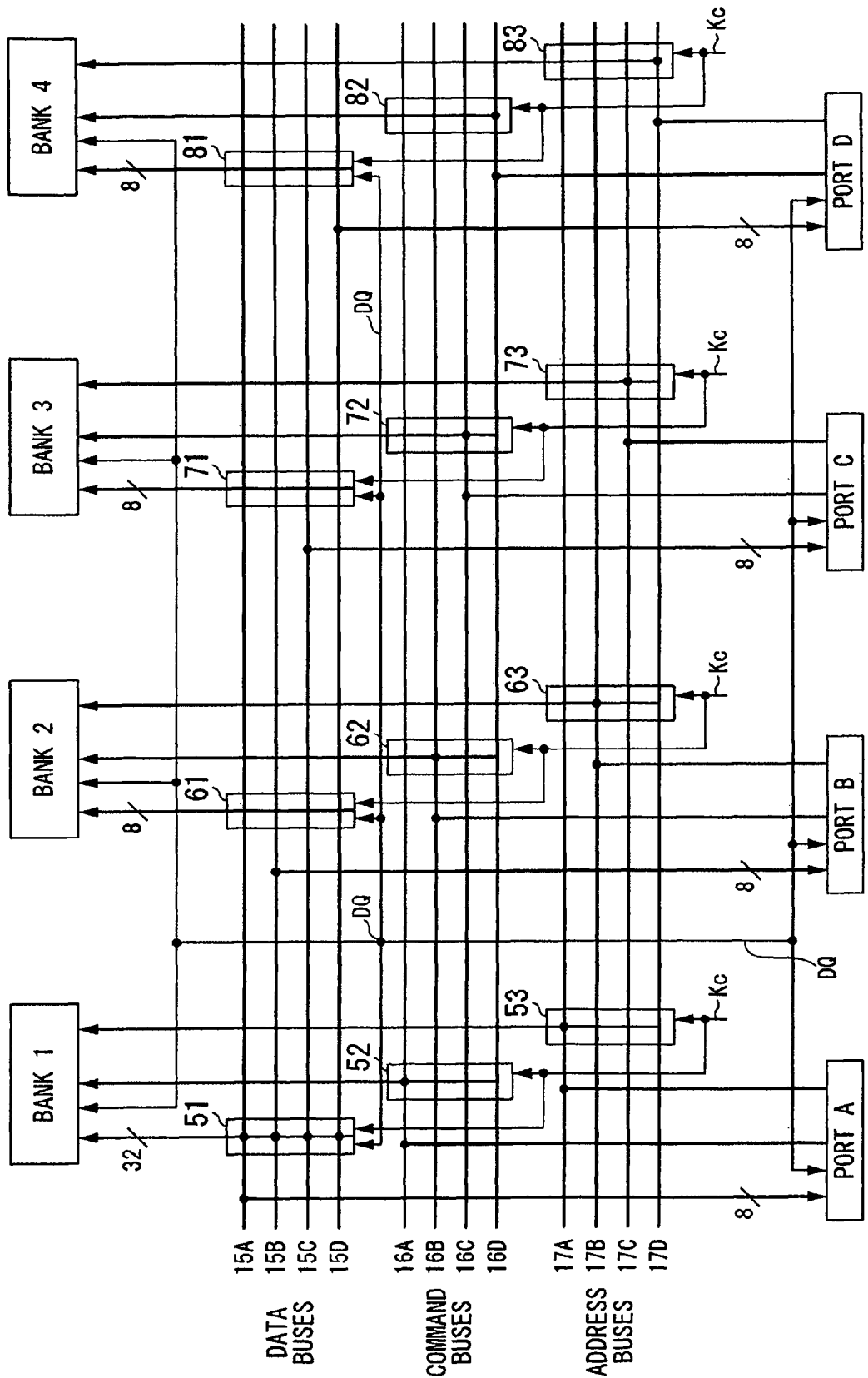
FIG. 6 shows signal routes when the port A uses DQ pins of ports A to D.

FIG. 6 is for explaining an example of DQ integration mode in the route switching circuit 11 of FIG. 2. FIG. 6 shows a connection state of the address buses 17A to 17D, the command buses 16A to 16D, and the data buses 15A to 15D between the four banks 1, 2, 3, and 4 and the four input/output ports A, B, C, and D in the case where a system made of the port A and the bank 1 uses the DQ pins of the port A to port D. In this case, as described for FIG. 3A and FIG. 3B, the data input/output signal of the bank 1 is essentially 32 bit wide.

This 32-bit wide input/output data signal line is divided into 8-bit widths, each connected to the data bus 15A to the data bus 15D by the crossbar switch 51 on the upper left portion that has received a DQ integration signal. As a result, the 32-bit wide data input/output signal of the bank 1 is divided and connected to the 8-bit wide DQ pin of the port A, the 8-bit wide DQ pin of the port B, the 8-bit wide DQ pin of the port C, and the 8-bit wide DQ pin of the port D.

Here, the DQ integration signal DQ that is input to the ports controls the ports whose DQ pins are integrated (ports B to D, in this example) so that the data input/output timing of the ports B to D is synchronized with the data input/output timing of the ports into which the DQ pins are integrated (port A, in this example).

In the connection state of FIG. 6, access is not possible from a port other than the port A to a bank other than the bank 1.

Figure 7:
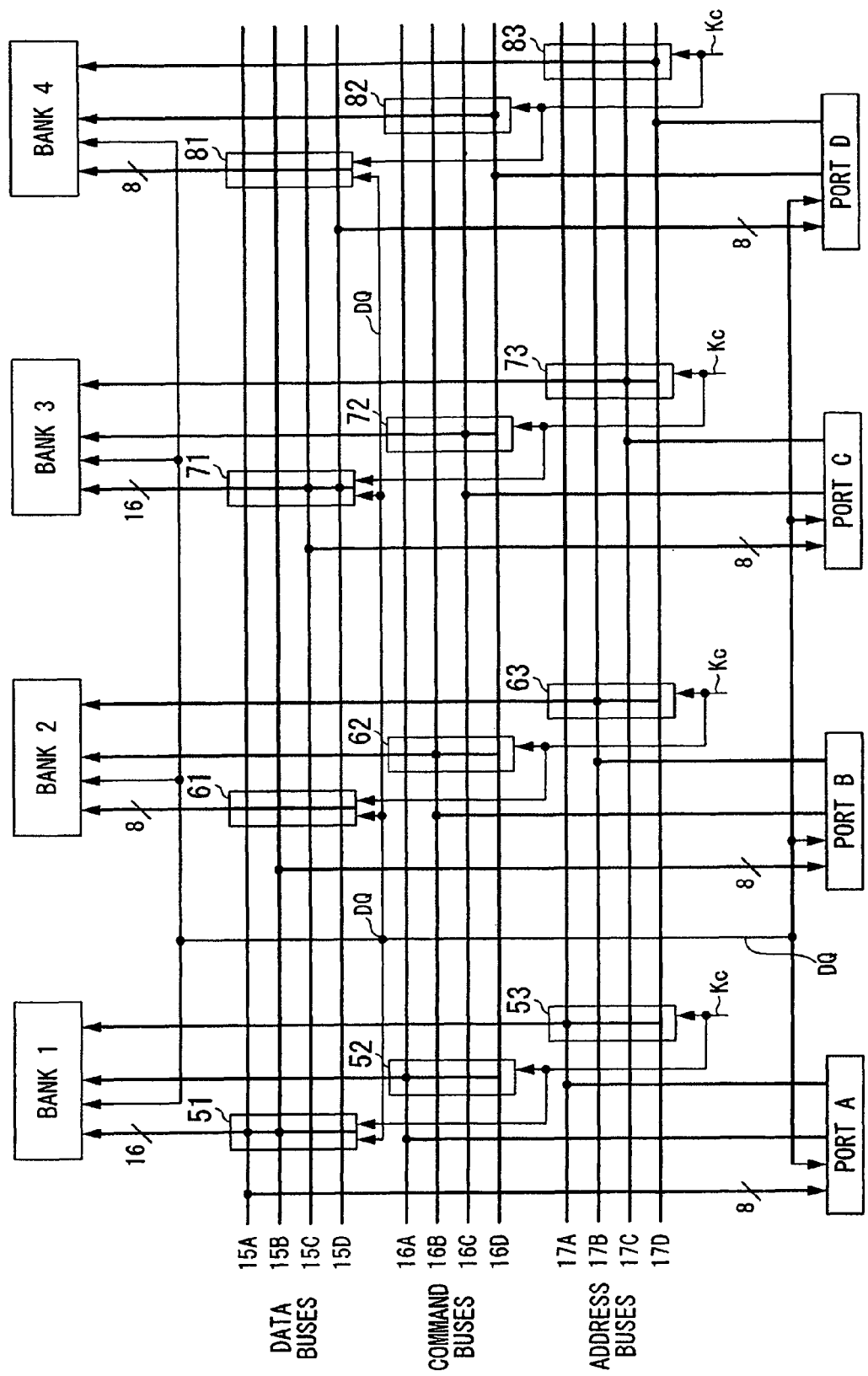
FIG. 7 shows signal routes when the port A uses DQ pins of the ports A and B, and the port C uses DQ pins of the ports C and D.

FIG. 7 is for explaining an example of DQ integration mode in the route switching circuit 11 of FIG. 2. FIG. 7 shows a connection state of the address buses 17A to 17D, the command buses 16A to 16D, and the data buses 15A to 15D between the four banks 1, 2, 3, and 4 and the four input/output ports A, B, C, and D in the case where a system made of the port A and the bank 1 uses the DQ pins of the port A and the port B and where a system made of the port C and the bank 3 uses the DQ pins of the port C and the port D.

In this case, as described for FIG. 3A and FIG. 3B, the data input/output signal bus of the bank 1 is essentially 16 bit wide. In addition, the data input/output signal of the bank 3 is also essentially 16 bit wide. These 16-bit wide input/output data signal lines are divided into 8-bit widths by the crossbar switch 51 in the leftmost and the crossbar switch 71 in the second from the right on the data buses 15A to 15D that have received a DQ integration signal. Thereby, the bank 1 is connected to the data buses 15A and 15B, and the bank 3 is connected to the data buses 15C and 15D. As a result, the 16-bit wide data input/output signal of the bank 1 is divided and connected to the 8-bit wide DQ pin of the port A and the 8-bit wide DQ pin of the port B. In addition, the 16-bit wide data input/output signal of the bank 3 is divided and connected to the 8-bit wide DQ pin of the port C and the 8-bit wide DQ pin of the port D.

Here, the DQ integration signal DQ that is input to the ports controls the data input/output timing of the ports whose DQ pins are integrated (ports B and D, in this example) so that the data input/output timing of the ports B and D is synchronized with the data input/output timing of the ports into which the DQ pins are integrated (port A and C, in this example).

Second Embodiment

Figure 8:
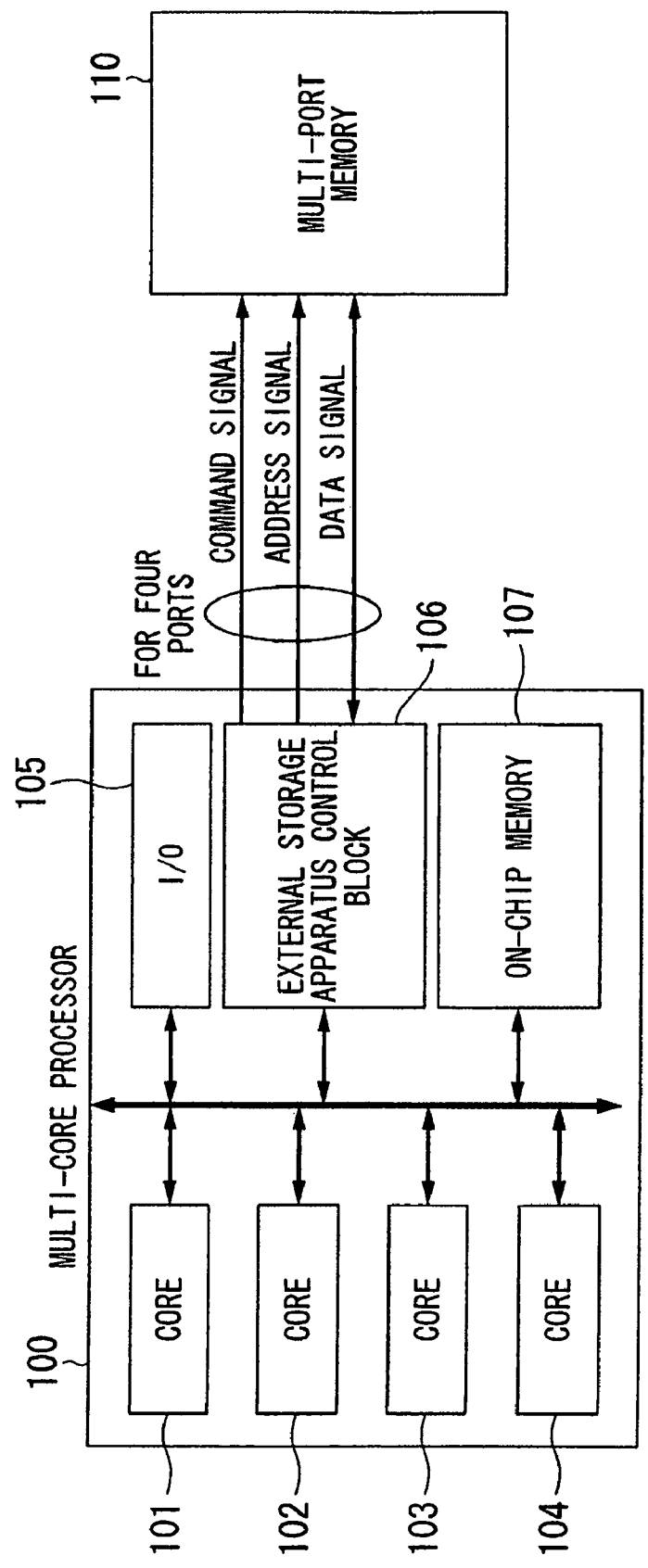
FIG. 8 shows a configuration of a computer system with a multi-core processor and multi-port memory according to a second embodiment of the present invention.

FIG. 8 shows an exemplary configuration of a computer system including: a multi-core processor 100 with four CPU cores; and a multi-port memory 110 according to an embodiment of the present invention.

In FIG. 8, the multi-core processor 100 includes four CPU cores: core 101, core 102, core 103, and core 104. The multi-core processor 100 includes: an I/O 105 that functions as an interface with an external circuit; an external storage apparatus control block 106; and an on-chip memory 107.

In the computer system shown in FIG. 8, the multi-port memory 110 functions as an external storage apparatus for the multi-core processor 100. The external storage apparatus control block 106 of the processor chip controls the multi-port memory 110. For example, it is possible for the external storage apparatus control block 106 to allocate four CPU cores 101, 102, 103, and 104 of the multi-core processor to four ports of the multi-port memory 110. According to a required amount of access band width of a CPU and to memory access ready periods of the other CPUs, it is possible to dynamically change a bit width of the data input/output signal for an optional single CPU core and an optional single bank, for example, into an 8-bit width, a 16-bit width, or a 32-bit width. Therefore, in a system that uses a multi-core processor, a data transfer time from/to a memory is unlikely to be a bottleneck, to thereby make it possible to improve the performance of the system.

As described above, in the multi-port memory of the embodiments of the present invention, a plurality of banks are allocated to a plurality of CPU cores via one ore more input/output ports. When data transfer load of an input/output port exceeds the limit of its data transfer capability during the period of time when a data transfer of another input/output port is not performed, it is possible to integrate data signal lines of the input/output ports where no transfer is performed into the data signal line of the input/output port where the data transfer capability has exceeded its limit, to thereby dynamically improve the data transfer capability. Therefore, in a system that uses a multi-core processor, a data transfer time with memory is unlikely to be a bottleneck, to thereby make it possible to improve the performance of the system.

A computer system described above may be adapted to a computer system which uses single-core processor.

While the embodiments of the present invention have been described above, the multi-port memory and the computer system of the embodiments of the present invention are not limited to the aforementioned examples shown in the figures. Obviously, various modifications can be made without departing from the spirit or scope of the invention.

What is claimed is:

1. A multi-port memory, comprising:
m ($m \geq 2$) input/output ports independent of one another;
n ($n \geq 2$) memory banks independent of one another; and
a route switching circuit capable of optionally setting signal routes of a command, an address, and input/output data between the m input/output ports and the n memory banks,
wherein the route switching circuit allocates p ($1 \leq p \leq m$) input/output ports optionally selected from the m input/output ports to a memory bank optionally selected from the n memory banks; and
the route switching circuit is made of a group of crossbar switches capable of optionally setting signal routes of a command, an address, and input/output data between the m input/output ports and the n memory banks.

2. A computer system comprising:
a processor;
first and second memory banks;
a first data input/output portion provided between the processor and the first memory bank, and coupled to the first memory bank, receiving first data from or sending the first data to the first memory bank, each of the receiving and sending of the first data input/output portion being controlled by the processor;
a second data input/output portion provided between the processor and the second memory bank, and coupled to the second memory bank, receiving second data from or sending the second data to the second memory bank, each of the receiving and sending of the second data input/output portion being controlled by the processor; and
a route switching circuit provided between the first memory bank and the second data input/output portion, setting a signal route of a command, an address, and input/output data between the first and second data input/output portions and the first and second memory banks, and allocating a data input/output portion selected from the first and second data input/output portions to a memory bank selected from the first and second memory banks.

3. The computer system according to claim 2, wherein
the route switching circuit connects the first memory bank and the second data input/output portion so that the first and second data input/output portions respectively receive the first and second data from or send the first and second data to the first memory bank when the route switching circuit receives a first command signal from the processor, and
the route switching circuit disconnects the first memory bank from the second data input/output portion so that the first data input/output portion receives the first data from or sends the first data to the first memory bank and the second data input/output portion receives the second data from or sends the second data to the second memory bank when the route switching circuit receives receiving a second command signal from the processor.

4. The computer system according to claim 2, wherein
the first memory bank inputs or outputs the first and second data simultaneously in response to the first command signal from the processor, and the first and second memory banks respectively input or output the first and second data simultaneously in response to the second command signal from the processor.

5. A multi-port memory, comprising:
m ($m \geq 2$) input/output ports independent of one another;
n ($n \geq 2$) memory banks independent of one another;
a route switching circuit capable of optionally setting signal routes of a command, an address, and input/output data between the m input/output ports and the n memory banks,
wherein route switching circuit allocates p ($1 \leq p \leq m$) input/output ports optionally selected from the m input/output ports to a memory bank optionally selected from the n memory banks; and
a route control circuit that generates a route switching signal for setting a signal route between the memory banks and the selected p input/output ports in the route switching circuit.

6. The multi-port memory according to claim 5, wherein
the route switching circuit comprises a switch which sets a signal route between the m input/output ports and the n memory banks, the switch being controlled by the route switching signal.

7. The multi-port memory according to claim 5, further comprising
an arbitration circuit which receives an arbitration signal from the route control circuit and outputs a port control signal to the input/output ports.

8. The multi-port memory according to claim 5, wherein
the route control circuit generates a DQ integration signal for integrating the selected p input/output ports.

9. The multi-port memory according to claim 8, wherein
the route control circuit receives the command, and if the command selects a DQ integration mode, then the route control circuit outputs the DQ integration signal to switch a connection state of the route switching circuit so as to implement the DQ integration mode.

10. A multi-port memory, comprising:
m ($m \geq 2$) input/output ports independent of one another;
n ($n \geq 2$) memory banks independent of one another;
a route switching circuit capable of optionally setting signal routes of a command, an address, and input/output data between the m input/output ports and the n memory banks,
wherein the route switching circuit allocates p ($1 \leq p \leq m$) input/output ports optionally selected from the m input/output ports to a memory bank optionally selected from the n memory bank; and
a command signal bus, address signal bus and data signal bus connected to the m input/output ports via the route switching circuit.

* * * * *